(12) United States Patent
Oishi et al.

(10) Patent No.: US 7,997,262 B2
(45) Date of Patent: Aug. 16, 2011

(54) METHOD OF IMPROVING NANOTOPOGRAPHY OF SURFACE OF WAFER AND WIRE SAW APPARATUS

(75) Inventors: Hiroshi Oishi, Fukushima (JP); Tadahiro Kato, Fukushima (JP)

(73) Assignee: Shin-Etsu Handotai Co., Ltd., Tokyo (JP)

( * ) Notice: Subject to any disclaimer, the term of this patent is extended or adjusted under 35 U.S.C. 154(b) by 754 days.

(21) Appl. No.: 11/990,622

(22) PCT Filed: Aug. 9, 2006

(86) PCT No.: PCT/JP2006/315706
§ 371 (c)(1), (2), (4) Date: Feb. 19, 2008

(87) PCT Pub. No.: WO2007/026512
PCT Pub. Date: Mar. 8, 2007

(65) Prior Publication Data
US 2010/0180880 A1   Jul. 22, 2010

(30) Foreign Application Priority Data

Aug. 31, 2005   (JP) ................................. 2005-252180

(51) Int. Cl.
*B28D 5/04*   (2006.01)
(52) U.S. Cl. ...................................... 125/21; 125/16.02
(58) Field of Classification Search ............... 125/16.01, 125/16.02, 19, 21
See application file for complete search history.

(56) References Cited

U.S. PATENT DOCUMENTS

| 5,810,643 A | 9/1998 | Toyama |
| 6,065,461 A * | 5/2000 | Asakawa et al. ........... 125/16.02 |
| 6,371,101 B1 * | 4/2002 | Hauser ........................ 125/16.01 |
| 6,828,163 B2 * | 12/2004 | Kobayashi et al. ............. 438/14 |
| 2006/0249134 A1 | 11/2006 | Kawasaki et al. |

FOREIGN PATENT DOCUMENTS

| EP | 0 749 817 A1 | 12/1996 |
| JP | A-08-085053 | 4/1996 |
| JP | A-09-066522 | 3/1997 |
| JP | A-2000-304040 | 10/2000 |
| JP | A-2004-255534 | 9/2004 |
| WO | WO 2005/039824 A1 | 5/2005 |

OTHER PUBLICATIONS

Chinese Office Action issued on Nov. 20, 2009 in Chinese Application No. 2006800318696 (with partial translation).
European Search Report dated Jul. 20, 2010 in European Patent Application No. 06782522.4.

* cited by examiner

*Primary Examiner* — Timothy V Eley
(74) *Attorney, Agent, or Firm* — Oliff & Berridge, PLC

(57) ABSTRACT

The present invention provides a method of improving nanotopography of a surface of a wafer sliced from an ingot by using a wire saw apparatus, including improving straightness of feed of a work feed table which is included in the wire saw apparatus and used for feeding the ingot to a wire row formed by winding a wire around a plurality of rollers, and also provides a wire saw apparatus for slicing an ingot to manufacture a wafer, including: a wire row formed by winding a wire around a plurality of rollers; a work feed table for holding and feeding the ingot to the wire row; and a linear-motion guide for linearly guiding the work feed table, wherein a component having a wavelength of 20 to 200 mm in straightness of feed of the work feed table satisfies a PV value $\leq 1.0$ μm. As a result, there are provided the method of eliminating slice waviness having periodicity to improve the nanotopography of the surface of the wafer and the wire saw apparatus.

4 Claims, 4 Drawing Sheets

METHOD OF IMPROVING NANOTOPOGRAPHY OF SURFACE OF WAFER AND WIRE SAW APPARATUS

TECHNICAL FIELD

The present invention relates to a method of improving nanotopography of a surface of a wafer, e.g., a silicon wafer or a compound semiconductor wafer sliced from an ingot by using a wire saw apparatus, and to a wire saw apparatus.

BACKGROUND ART

For example, when manufacturing a silicon wafer, a single-crystal silicon ingot is sliced by using a wire saw apparatus (see, e.g., Japanese Patent Application Laid-open No. 85053-1996). The wire saw apparatus is an apparatus which enables a wire (a high-tension steel wire) to travel at a high speed and presses an ingot against the wire to be sliced (cut) while applying a slurry having GC (silicon carbide) abrasive grains dispersed in a liquid to the wire. As an apparatus for slicing an ingot, one which applies a tension of 2.5 to 3.0 kgf to a wire having a diameter of 0.14 mm to 0.18 mm and performs slicing while enabling the wire to travel in a reciprocating direction at an average speed of 400 to 500 m/min in a cycle of 1 to 2 c/min (30 to 60 s/c) is general in a conventional technology.

The wire is unreeled from one wire reel and enters groove rollers through a tension giving mechanism constituted of one or both of a dancer roller including a dead weight or a powder clutch having a constant torque motor connected thereto. The groove roller is a roller having a structure where a polyurethane resin is pressed in a peripheral part of a cast steel cylinder and grooves are formed on a surface thereof at a fixed pitch, and the wire is wound around such rollers for 300 to 400 turns and then taken up by the other wire reel through the other tension giving mechanism. The wire is driven in the reciprocating direction in a predetermined cycle by a groove roller driving motor. On the other hand, the ingot is pressed against the wire at a preprogrammed ingot feed speed and sliced.

FIG. 2 is a schematic view for explaining a mechanism for feeding an ingot in a conventional wire saw apparatus. In this wire saw apparatus 10', an ingot 2' is held to a work feed table 3' guided by an LM guide (a linear-motion guide) 4' and sliced by using a wire row 1' wound around groove rollers 5'. The LM guide 4' is generally constituted of a "track rail" and a "slide unit including a steel ball or a cylindrical runner", and the slide unit linearly and smoothly moves on the track rail when the steel ball or the cylindrical runner which is in contact with the track rail rotates.

On the other hand, a size of a surface waviness component called a "nanotopography" is a problem in wafers in recent years. This nanotopography is obtained by taking out a wavelength component of $\lambda=0.2$ to 20 mm whose wavelength is shorter than "sori" or "warp" but longer than "surface roughness" from a surface shape of a wafer, and it is very shallow waviness having a PV value of 0.1 to 0.2 μm or below. It is said that this nanotopography affects a yield of an STI (Shallow Trench Isolation) step in device manufacture.

Although the nanotopography is formed at processing steps (slicing to polishing) of a wafer, it has been revealed that the nanotopography due to slicing using a wire saw (i.e., slice waviness) can be classified into three types, i.e., "one which suddenly occurs," "one which occurs at start or end of slicing," and "one having periodicity". Of these three types of nanotopography, it can be considered that the "one which extemporaneously occurs" is caused due to wire disconnection or an error in tension control of the wire saw apparatus, whilst the "one which occurs at start or end of slicing" is caused due to a sudden change in a cut-resistance, often resulting in rejection in nanotopography numerical value judgment. On the other hand, the "waviness having periodicity" often results in rejection in nanotopography sensory test, but its cause is unknown.

DISCLOSURE OF INVENTION

It is an object of the present invention to provide a method of eliminating slice waviness having periodicity to improve nanotopography of a surface of a wafer and a wire saw apparatus.

To achieve this object, according to the present invention, there is provided a method of improving nanotopography of a surface of a wafer sliced from an ingot by using a wire saw apparatus, at least including improving straightness of feed of a work feed table which is included in the wire saw apparatus and used for feeding the ingot to a wire row formed by winding a wire around a plurality of rollers.

Improving the straightness of feed of the work feed table for feeding the ingot to the wire row in this manner enables eliminating slice waviness having periodicity and improving the nanotopography of the wafer surface.

It is to be noted that the straightness is defined as a distance Y from an ideal straight line of a trajectory when a material body moves by a distance X, and it is represented as Y/X.

In this case, it is preferable that straightness of feed of the work feed table is improved by improving deformation of a linear-motion guide for linearly guiding the work feed table.

The straightness of feed of the work feed table can be assuredly improved by improving deformation of the linear-motion guide for linearly guiding the work feed table in this manner.

Further, it is preferable that deformation of the linear-motion guide is improved by adjusting an interval between attachment holes and tightening torque of bolts, and the holes are used to attach the linear-motion guide to the wire saw apparatus by using the bolts.

Since deformation of the linear-motion guide can be more assuredly improved by adjusting an interval between the attachment holes and tightening torque of bolts, and the holes are used to attach the linear-motion guide to the wire saw apparatus by using the bolts as explained above, the straightness of feed of the work feed table can be effectively improved.

Furthermore, according to the present invention, there is provided a wire saw apparatus for slicing an ingot to manufacture a wafer, including at least: a wire row formed by winding a wire around a plurality of rollers; a work feed table for holding and feeding the ingot to the wire row; and a linear-motion guide for linearly guiding the work feed table, wherein a component having a wavelength of 20 to 200 mm in straightness of feed of the work feed table satisfies a PV value $\leq 1.0$ μm.

As explained above, the wire saw apparatus which can eliminate slice waviness having periodicity and manufacture a wafer having an improved surface nanotopography can be provided as long as it includes: the wire row; the work feed table for holding the ingot to be fed to the wire row; and the linear-motion guide for linearly guiding the work feed table and the component having the wavelength of 20 to 200 mm in the straightness of feed of the work feed table satisfies the PV value $\leq 1.0$ μm.

Improving the straightness of feed of the work feed table for feeding the ingot to the wire row in accordance with the present invention enables eliminating slice waviness having periodicity and improving the nanotopography of the wafer surface.

Moreover, the wire saw apparatus according to the present invention can be a wire saw apparatus which can eliminate slice waviness having periodicity and manufacture a wafer having an improved surface nanotopography.

BEST MODE FOR CARRYING OUT THE INVENTION

The present invention will now be explained hereinafter.

As explained above, in nanotopography (slice waviness) caused due to slicing using a wire saw, waviness having periodicity was often rejected in nanotopography sensory test, but a cause of occurrence of such waviness was unknown, and hence an improvement was difficult.

The present inventors discovered that this cause is straightness of feed of a work feed table and the straightness correlates with the slice waviness having periodicity.

The present inventors conducted the following experiment to find out this cause when achieving the present invention.

Figure 3:
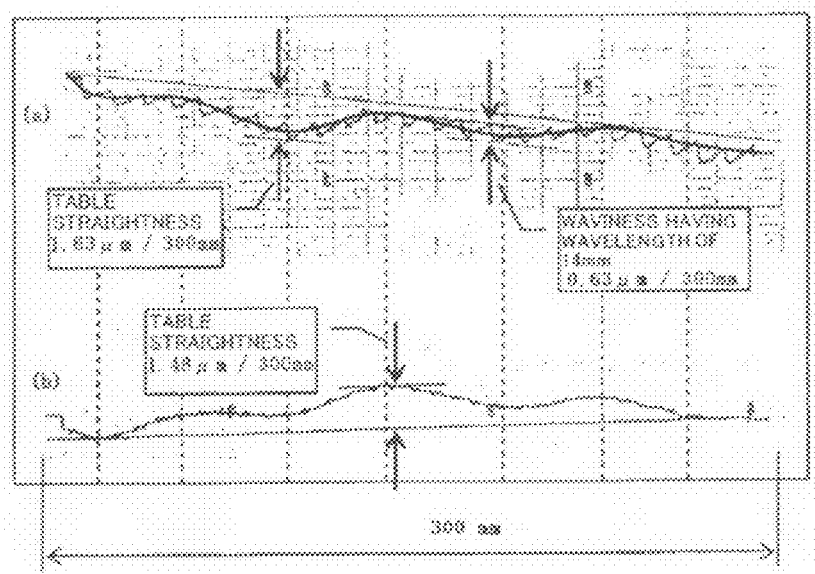
FIG. 3 is a graph showing measurement results of straightness of feed of a work feed table, in which a line (a) is indicative of straightness of feed of the work feed table before an improvement and a line (b) is indicative of straightness of feed of the table having improved roundness of a cylindrical runner used for an LM guide.

That is, the straightness of feed of the work feed table in a wire saw apparatus was measured by using a straight edge and an electric micrometer. Specifically, the straight edge was attached to the work feed table, and a dislocation from a straight line was measured by the electric micrometer while feeding the work feed table approximately 300 mm by an LM guide (a linear-motion guide). FIG. 3 shows its result. A line (a) in FIG. 3 represents straightness of feed of the work feed table before performing a later-explained improvement. It can be understood that a waviness component (a PV value: 0.63 µm) having a wavelength of 14 mm corresponding to a pitch of a cylindrical runner overlaps a long-period waviness component (a PV value: 1.63 µm) having a wavelength of approximately 100 mm in the line (a). On the other hand, a line (b) in FIG. 3 represents straightness of feed of the work feed table having improved roundness of a cylindrical runner used for the LM guide. In the line (b), the waviness component having the wavelength of 14 mm corresponding to the pitch of the cylindrical runner is reduced to ⅓ or below of that before the improvement. As a result, the entire straightness becomes 1.48 µm/300 mm, and the improvement can be observed. However, a value 1.48 µm as the PV value was insufficient for an improving effect.

Figure 4:
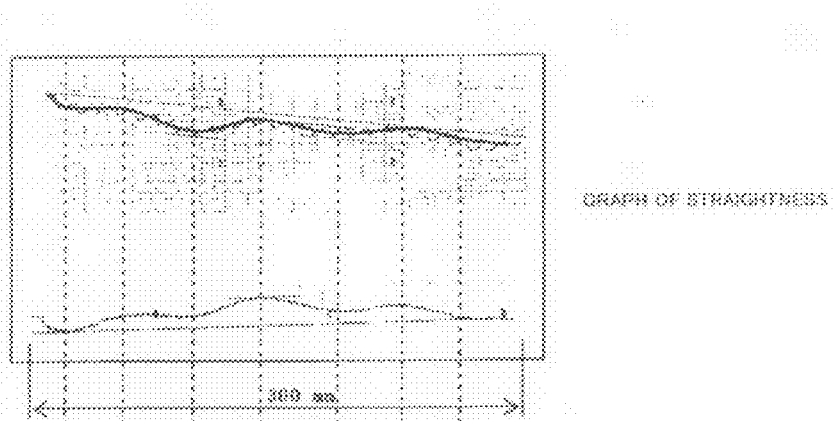
FIG. 4 is a view showing a graph of straightness of feed of the work feed table of the wire saw apparatus depicted in FIG. 3 and "slice waviness having periodicity" which can be observed in nanotopography map in a polished silicon wafer having a diameter of 300 mm in comparison with each other.

Thus, when the graph of straightness of feed of the work feed table in the wire saw apparatus depicted in FIG. 3 was compared with "slice waviness having periodicity" observed in nanotopography map in a polished silicon wafer having a diameter of 300 mm sliced by using this wire saw apparatus and their correlation was checked; the following facts were revealed. That is, as indicated by dotted lines in FIG. 4, the "slice waviness having periodicity" observed in the nanotopography map in the polished silicon wafer well matched with a long-period component of straightness of feed of the work feed table. The present inventors discovered from this result a possibility of being able to reduce further the "slice waviness having periodicity" by improving the long-period component of straightness of feed of the work feed table. On the other hand, it was found that short-period waviness having a wavelength of 14 mm has a small influence on the nanotopography of the polished wafer.

The present inventors conceived that improving straightness (especially long-period waviness having a wavelength which exceeds 14 mm and is such as 20 to 200 mm) of the work feed table enables improving the nanotopography of a wafer surface, thereby bringing the present invention to completion.

Although an embodiment according to the present invention will now be explained hereinafter, the present invention is not restricted thereto.

Figure 1:
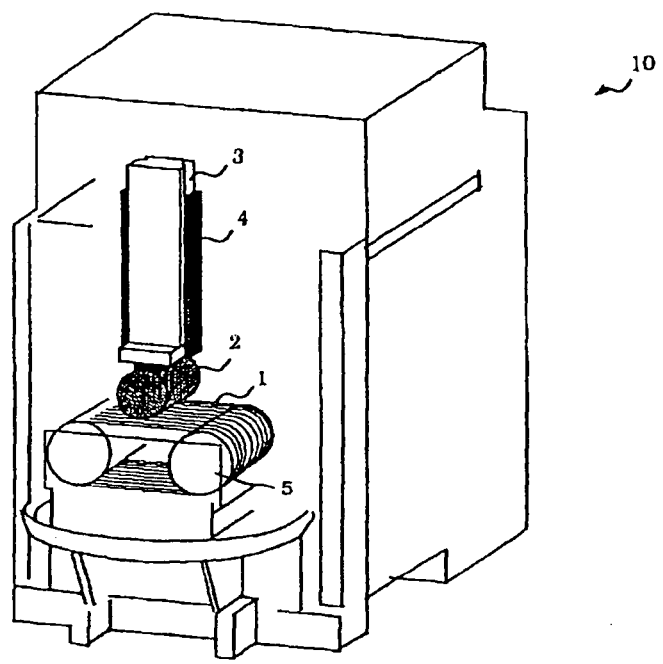
FIG. 1 is a schematic view showing an example of a wire saw apparatus according to the present invention.

FIG. 1 is a schematic view showing an example of a wire saw apparatus according to the present invention.

The feature of this wire saw apparatus 10 is that it includes at least a wire row 1 formed by winding a wire saw around groove rollers 5, a work feed table 3 for holding and feeding an ingot 2 to the wire row 1, and an LM guide 4 for linearly guiding the work feed table 3, and a component having a wavelength of 20 to 200 mm as a long-period component in straightness of feed of the work feed table 3 satisfies a PV value $\leq 1.0$ µm. The wire saw apparatus 10 has such a structure to enable manufacturing a wafer having an improved nanotopography of a surface thereof.

Although straightness of short-period waviness having a short wavelength, e.g., the wavelength of 14 mm can be improved by improving roundness of a cylindrical runner, an improving effect is small in nanotopography of a polished wafer. Further, since long-period waviness having a long wavelength exceeding a diameter of a wafer, e.g., 200 to 300 mm has a small influence in the polished wafer, a component with a wavelength of 20 to 200 mm satisfying the PV value $\leq 1.0$ µm can suffice. Incidentally, in the component having the wavelength of 20 to 200 mm, the smaller PV value is preferable.

Such a wire saw apparatus according to the present invention can be realized by improving straightness of feed of the work feed table in a conventional wire saw apparatus by, e.g., using a later-explained method according to the present invention.

Furthermore, according to a method of improving the nanotopography of the present invention, improving straightness of feed of the work feed table used for feeding the ingot to the wire row enables improving the nanotopography of the wafer surface. Such an improvement in straightness of feed of the work feed table can be carried out by, e.g., improving straightness of the work feed table or the LM guide itself, improving an attachment precision of the LM guide with respect to the wire saw apparatus, improving deformation of the LM guide, or improving roundness of the cylindrical runner. For example, as specific precision improvement methods, there are methods of:

(a) adjusting an interval between attachment holes and tightening torque of bolts in the LM guide; and (b) setting a direction of attachment bolts of the LM guide in parallel with a wire traveling direction to reduce an influence on waviness due to deformation of the LM guide.

Figure 2:
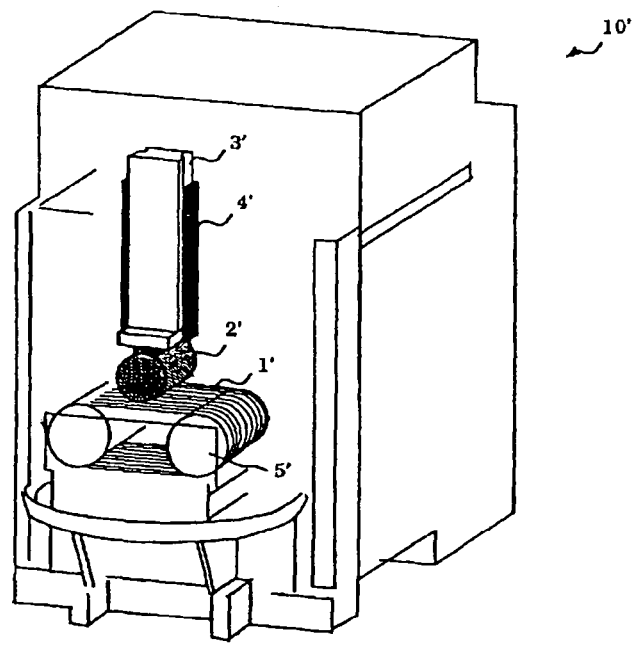
FIG. 2 is a schematic view for explaining a mechanism for feeding an ingot in a conventional wire saw apparatus.
Figure 8:
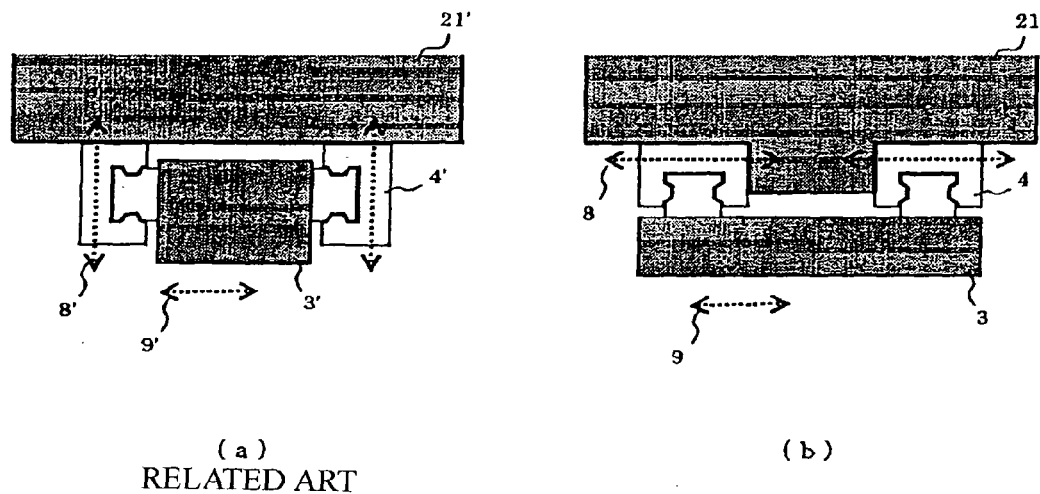
FIG. 8(a) is a view for explaining an example where a direction of bolts used to attach the LM guide to the wire saw apparatus is set to be perpendicular to a wire traveling direction and FIG. 8(b) is a view for explaining an example where a direction of the LM guide attachment bolts is set to be parallel to the wire traveling direction when the wire saw apparatus is seen from above.

A direction 8' of bolts which are used to attach an LM guide 4' to an LM guide attachment column 21' of the wire saw apparatus is perpendicular to a wire traveling direction 9' as in FIG. 8(a) in such a conventional wire saw apparatus 10' depicted in FIG. 2, but a direction 8 of bolts which are used to attach an LM guide 4 to an LM guide attachment column 21 is set in parallel to a wire traveling direction 9 as in FIG. 8(b) in such a wire saw apparatus 10 according to the present invention as shown in FIG. 1 about the method (b), thereby reducing an influence of deformation of the LM guide 4 on the waviness.

Figure 5:
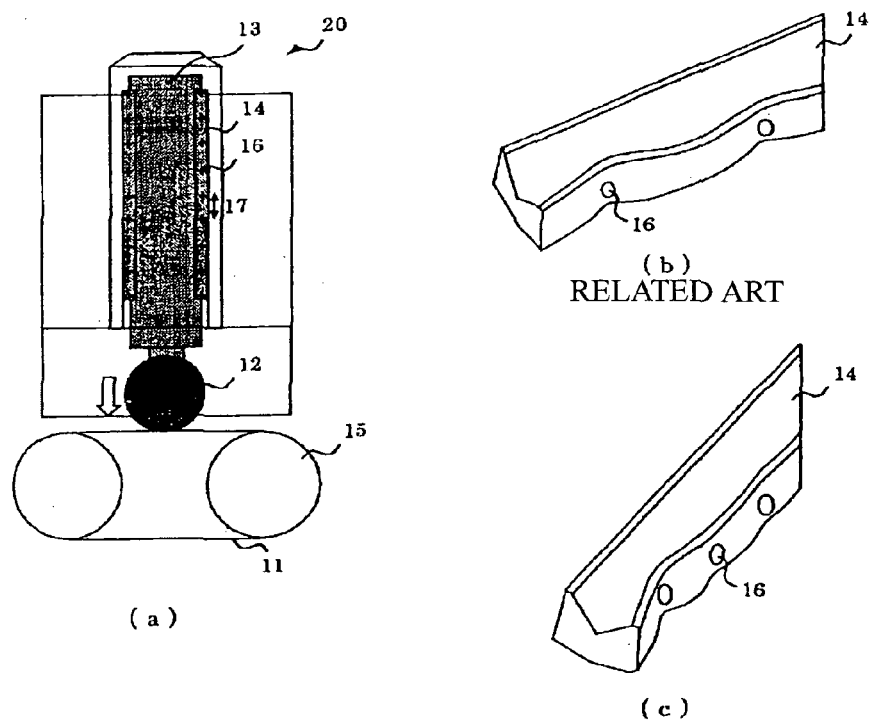
FIG. 5(a) is a schematic view showing a wire saw apparatus 20, and FIGS. 5(b) and (c) are schematic views showing simulation results of deformation of the LM guide when an interval of attachment holes and tightening torque of bolts in the LM guide are adjusted.

For example, in such a wire saw apparatus 20 including a work feed table 13 which is used for feeding an ingot 12 to a wire row 11 formed by winding a wire around groove rollers 15 as shown in FIG. 5(a), intervals 17 between attachment holes 16 and tightening torque of bolts (not shown) in an LM guide 14 were changed to simulate its effect based on a finite element method. Then, it was confirmed in the simulation that deformation of the LM guide 14 was improved as shown in FIGS. 5(b) and (c) and straightness of feed was improved from 2.5 μm/300 mm to 1.2 μm/300 mm when the intervals of the attachment holes and the tightening torque of the bolts in the LM guide were changed from 100 mm and 60 Nm (FIG. 5(b)) to 75 mm and 40 Nm (FIG. 5(c)).

In this manner, straightness of feed of the work feed table can be assuredly improved by improving deformation of the linear-motion guide for linearly guiding the work feed table and, in particular, this deformation of the linear-motion guide can be more assuredly improved by adjusting intervals of the attachment holes which are used to attach the linear-motion guide to the wire saw apparatus by using bolts and tightening torque of the bolts.

Although the present invention will now be specifically explained based on examples of the present invention and comparative examples hereinafter, the present invention is not restricted thereto.

EXAMPLE 1

Comparative Example 1

In the wire saw apparatus shown in FIG. 1, intervals of attachment holes which are used to attach an LM guide to the wire saw apparatus by using the bolts and tightening torque of bolts were respectively adjusted from 100 mm and 60 Nm (Comparative Example 1) to 75 mm and 40 Nm (Example 1) like the above-explained simulation. Further, straightness of feed of the work feed table was measured by the same method as above.

Figure 6:
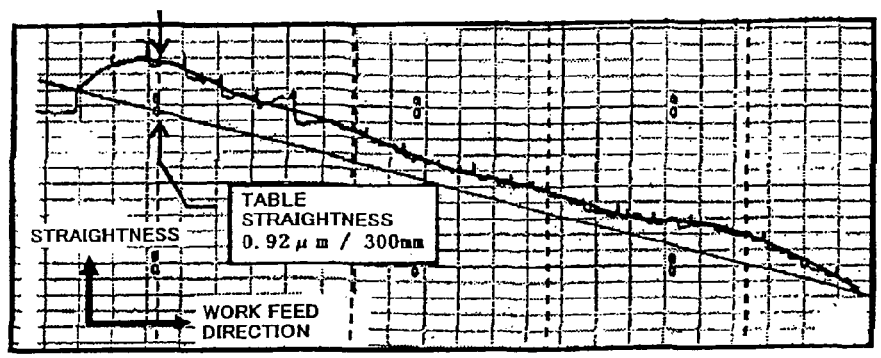
FIG. 6 is a graph showing straightness of feed of a work feed table according to Example 1.

As a result, while straightness of feed of the work feed table was 1.48 μm/300 mm and a component having a wavelength of approximately 100 mm was 1.48 μm in terms of a PV value in Comparative Example 1, straightness of feed of the work feed table was 0.92 μm/300 mm and a component having a wavelength of approximately 100 mm was 0.92 μm in terms of the PV value in Example 1 as shown in FIG. 6, thereby providing the wire saw apparatus having the greatly improved straightness of feed of the work feed table. Based on a result depicted in FIG. 6, if waviness at a work feed start position can be adjusted, a further improvement can be expected.

EXAMPLE 2

Comparative Example 2

Figure 7:
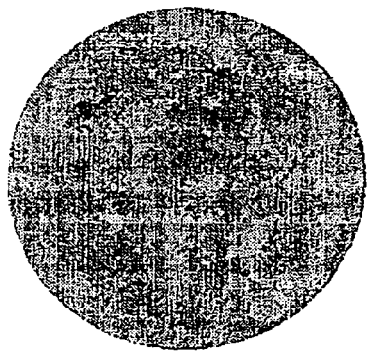
FIG. 7 is a view showing a typical example of nanotopography map of a polished silicon wafer according to Example 2.

The wire saw apparatuses in Example 1 and Comparative Example 1 were utilized to slice a silicon ingot having a diameter of 300 mm under conditions whose an outline is shown in Table 1, and the sliced ingots were polished to obtain silicon wafers (Example 2, Comparative Example 2). FIG. 7 shows a typical example of nanotopography map of the polished silicon wafer according to Example 2. Moreover, Table 2 shows N numbers of the wafers and frequencies of occurrence of "slice waviness having periodicity" as a problem with a frequency of occurrence in Comparative Example 2 being determined as 100%. The frequency of occurrence of "slice waviness having periodicity" in Example 2 was improved to approximately 1/10 of that in Comparative Example 2 by improving straightness of feed of the work feed table carried out in Example 1.

TABLE 1

| | Item | Condition |
|---|---|---|
| Work | Ingot diameter | 300 mm |
| Wire | Wire diameter | 160 μm |
| | Wire tension | 2.8 kgf |
| | New wire line supply amount | 100 m/min |
| | Wire reversal cycle | 60 s |
| | Wire traveling speed | 500 m/min |
| Slurry | Abrasive grain | GC#1000 (average) |
| | Abrasive grain concentration (coolant: abrasive grain) | 50:50 (weight ratio) |
| | Slurry temperature | 25.0° C. (constant) |

TABLE 2

| | | Frequency of occurrence of slice waviness having periodicity |
|---|---|---|
| Comparative Example 2 | N number | 762 |
| | Average value | 100% |
| Example 2 | N number | 240 |
| | Average value | 10% |

It is to be noted that the present invention is not restricted to the foregoing embodiment. The foregoing embodiment is just an example, and any embodiment having substantially the same feature as that in a technical concept described in claims of the present invention and demonstrating the same functions and effect is included in a technical scope of the present invention.

For example, although the example where straightness of feed of the work feed table is improved mainly by adjusting an interval between the attachment holes and the tightening torque of the bolts in the linear-motion guide has been explained above, the present invention is not restricted thereto, and any method can be adopted as long as straightness of feed of the work feed table can be improved.

That is, according to the present invention, since slice waviness having periodicity can be improved if straightness of feed of the work feed table can be improved, the method of improving straightness of feed of the work feed table is not restricted in particular.

The invention claimed is:

1. A method of improving nanotopography of a surface of a wafer sliced from an ingot by using a wire saw apparatus, the method comprising:
    improving straightness of feed of a work feed table included in the wire saw apparatus and used for feeding the ingot to a wire row formed by winding a wire around a plurality of rollers so that a component having a wavelength of 20 to 200 mm in straightness of feed of the work feed table satisfies a PV value $\leq 1.0$ μm, and thereby
    improving nanotopography of the surface of the wafer by reducing slice waviness having periodicity.

2. The method of improving nanotopography of a surface of a wafer according to claim 1, wherein straightness of feed of the work feed table is improved by reducing deformation of a linear-motion guide for linearly guiding the work feed table.

3. The method of improving nanotopography of a surface of a wafer according to claim 2, wherein
    deformation of the linear-motion guide is reduced by adjusting an interval between attachment holes formed in the linear-motion guide and tightening torque of bolts, and
    the attachment holes are used to attach the linear-motion guide to the wire saw apparatus by using the bolts.

4. A wire saw apparatus for slicing an ingot to manufacture a wafer, comprising:
    a wire row formed by winding a wire around a plurality of rollers;
    a work feed table for holding and feeding the ingot to the wire row; and
    a linear-motion guide for linearly guiding the work feed table, wherein a component having a wavelength of 20 to 200 mm in straightness of feed of the work feed table satisfies a PV value $\leq 1.0$ μm.

* * * * *